United States Patent
Reddy et al.

(10) Patent No.: US 10,009,336 B2
(45) Date of Patent: Jun. 26, 2018

(54) NETWORK SECURITY SYSTEM TO VALIDATE A SERVER CERTIFICATE

(71) Applicant: Cisco Technology, Inc., San Jose, CA (US)

(72) Inventors: K. Tirumaleswar Reddy, Bangalore (IN); Prashanth Patil, Mountain View, CA (US); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 15/157,588

(22) Filed: May 18, 2016

(65) Prior Publication Data
US 2017/0339130 A1    Nov. 23, 2017

(51) Int. Cl.
| | |
|---|---|
| H04L 29/06 | (2006.01) |
| H04L 29/12 | (2006.01) |
| H04L 29/08 | (2006.01) |
| H04L 9/30 | (2006.01) |
| H04L 9/32 | (2006.01) |

(52) U.S. Cl.
CPC ............ *H04L 63/0823* (2013.01); *H04L 9/30* (2013.01); *H04L 9/3263* (2013.01); *H04L 61/1511* (2013.01); *H04L 61/6013* (2013.01); *H04L 67/2847* (2013.01); *H04L 69/326* (2013.01); *H04L 63/0428* (2013.01); *H04L 63/1466* (2013.01)

(58) Field of Classification Search
CPC .......................... H04L 63/0823; H04L 9/3263
See application file for complete search history.

(56) References Cited

U.S. PATENT DOCUMENTS

| | | | | |
|---|---|---|---|---|
| 8,719,112 | B2* | 5/2014 | Carpenter | G06Q 30/06 705/26.63 |
| 9,398,055 | B2* | 7/2016 | Brunson | H04L 63/0281 |
| 2008/0229025 | A1* | 9/2008 | Plamondon | G06F 12/0862 711/126 |

(Continued)

FOREIGN PATENT DOCUMENTS

WO    WO-2014048746 A1    4/2014

OTHER PUBLICATIONS

Halpern et al. "Service Function Chaining (SFC) Architecture" Internet Engineering Task Force (IETF); Oct. 2015; pp. 1-32.

(Continued)

*Primary Examiner* — Ali Shayanfar
(74) *Attorney, Agent, or Firm* — Parker Ibrahim & Berg LLP; James M. Behmke; Stephen D. LeBarron

(57) ABSTRACT

In one embodiment, a Domain Name Service (DNS) server pre-fetches domain information regarding a domain that includes certificate information for the domain. The DNS server receives a DNS request that includes a security request for the domain in metadata of a Network Service Header (NSH) of the DNS request. The DNS server retrieves the certificate information for the domain from the pre-fetched information regarding the domain, in response to receiving the security request. The DNS server sends, to a Transport Layer Security (TLS) proxy, a DNS response for the domain that includes the certificate information in metadata of an NSH of the DNS response.

20 Claims, 11 Drawing Sheets

(56) References Cited

U.S. PATENT DOCUMENTS

| | | | | |
|---|---|---|---|---|
| 2009/0287935 | A1* | 11/2009 | Aull | H04L 9/3263 713/182 |
| 2012/0079584 | A1* | 3/2012 | Niemela | H04L 63/0823 726/10 |
| 2012/0203913 | A1* | 8/2012 | Pujare | H04L 51/36 709/227 |
| 2013/0063760 | A1* | 3/2013 | Kishimoto | G06F 21/33 358/1.14 |
| 2013/0080321 | A1* | 3/2013 | Mulhall | G06Q 30/02 705/41 |
| 2013/0297513 | A1* | 11/2013 | Kirillin | G06Q 40/02 705/67 |
| 2013/0311832 | A1* | 11/2013 | Lad | H04L 41/042 714/37 |
| 2014/0194094 | A1* | 7/2014 | Ahuja | H04W 4/021 455/410 |
| 2015/0264040 | A1* | 9/2015 | Schneider | H04L 63/0823 726/10 |
| 2015/0304384 | A1* | 10/2015 | Lee | H04L 67/02 709/203 |
| 2016/0065597 | A1* | 3/2016 | Nguyen | H04L 63/1441 726/22 |
| 2016/0094467 | A1* | 3/2016 | Hong | H04L 45/24 370/235 |
| 2016/0219018 | A1* | 7/2016 | Raman | H04L 63/02 |
| 2016/0323405 | A1* | 11/2016 | Luo | H04L 67/02 |
| 2017/0070436 | A1* | 3/2017 | Lubenski | H04L 1/1812 |
| 2017/0126645 | A1* | 5/2017 | Froelicher | H04L 63/061 |
| 2017/0272467 | A1* | 9/2017 | Osterweil | H04L 63/20 |

OTHER PUBLICATIONS

Evans et al. "Public Key Pinning Extension for HTTP" Internet Engineering Task Force (IETF); Apr. 2015; pp. 1-28.

Hoffman et al. The DNS-Based Authentication of Named Entities (DANE) Transport Layer Security (TLS) Protocol: TLSA; Aug. 2012; pp. 1-37.

Quinn et al. "Network Service Header draft-ietf-sfc-nsh-04.txt" Internet Engineering Task Force (IETF); Mar. 21, 2016; pp. 1-43.

* cited by examiner

NETWORK SECURITY SYSTEM TO VALIDATE A SERVER CERTIFICATE

TECHNICAL FIELD

The present disclosure relates generally to computer networks, and, more particularly, to a network security system to validate a server certificate.

BACKGROUND

Transport Layer Security (TLS) proxy functionality is a key security mechanism for many networks. In particular, a TLS proxy allows security systems such as firewalls and intrusion protection systems (IPSs) to inspect encrypted traffic between the enterprise network and the Internet. Notably, the TLS proxy may act as a "man in the middle" between a device in the enterprise network and the remote server, to obtain the cryptographic information needed to decrypt any encrypted traffic communicated between the device and the remote server, such as Hypertext Transfer Protocol Secure (HTTPS) traffic. In turn, the TLS proxy may intercept the encrypted traffic, decrypt the traffic using the obtained cryptographic information, and provide the decrypted traffic to the firewall, IPS, etc.

As part of its proxy functions, a TLS proxy validates the certificate of the remote server, to ensure that the device on the enterprise network is communicating with a trusted entity. This certificate validation generally involves checking whether the certificate contains the desired domain name of the remote server and whether the certificate was issued by a trusted certificate authority. Typically, a TLS proxy uses a default trust anchor list (e.g., a list of one or more entities that are already trusted by default), to validate the server certificate. However, this gives rise to several potential security vulnerabilities that could be exploited as part of a certificate validation attack: 1.) the TLS proxy has no way of knowing which trust anchor should vouch for the specific domain associated with the server certificate, and 2.) since any domain can be vetted by any certificate authority, all domains will be vulnerable to a man-in-the middle attack if a certificate authority becomes compromised.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a Domain Name Service (DNS) server pre-fetches domain information regarding a domain that includes certificate information for the domain. The DNS server receives a DNS request that includes a security request for the domain in metadata of a Network Service Header (NSH) of the DNS request. The DNS server retrieves the certificate information for the domain from the pre-fetched information regarding the domain, in response to receiving the security request. The DNS server sends, to a Transport Layer Security (TLS) proxy, a DNS response for the domain that includes the certificate information in metadata of an NSH of the DNS response.

In further embodiments, a Transport Layer Security (TLS) proxy receives, from a Domain Name Service (DNS) server, a DNS response for a domain that includes certificate information in metadata of a Network Service Header (NSH) of the DNS response. The TLS proxy stores the certificate information. The TLS proxy performs a TLS handshake with a network device and receives a certificate for the domain as part of the TLS handshake. The TLS proxy validates the certificate for the domain using the certificate information.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
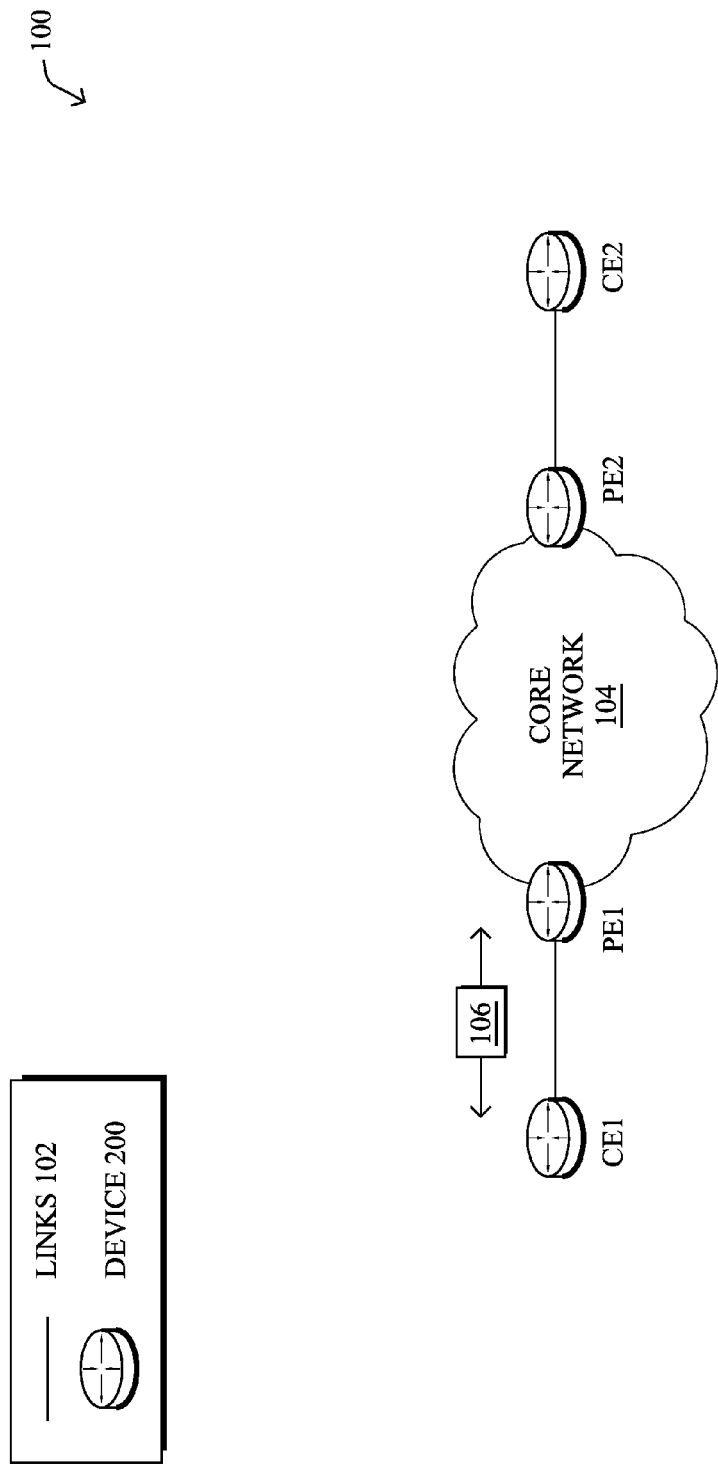
FIG. 1 illustrates an example communication network.

FIG. 1 is a schematic block diagram of an example computer network 100 illustratively comprising nodes/devices 200, such as a plurality of routers/devices interconnected by links or networks, as shown. For example, customer edge (CE) routers (e.g., CE1 and CE2) may be interconnected with provider edge (PE) routers (e.g., PE1 and PE2, respectively), to communicate across a core network, such as an illustrative core network 104. Core network 104 may be a Multi-Protocol Label Switching (MPLS) network or, alternatively, any other form of network, such as an Internet-based network.

The various nodes/devices 200 may exchange data packets 106 (e.g., traffic/messages) via computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. In various embodiments, nodes/devices 200 may employ a secure communication mechanism, to encrypt and decrypt data packets 106. For example, nodes/devices 200 shown may use a Transport Layer Security (TLS) mechanism, such as the HTTPS protocol, to encrypt and decrypt data packets 106.

Figure 2:
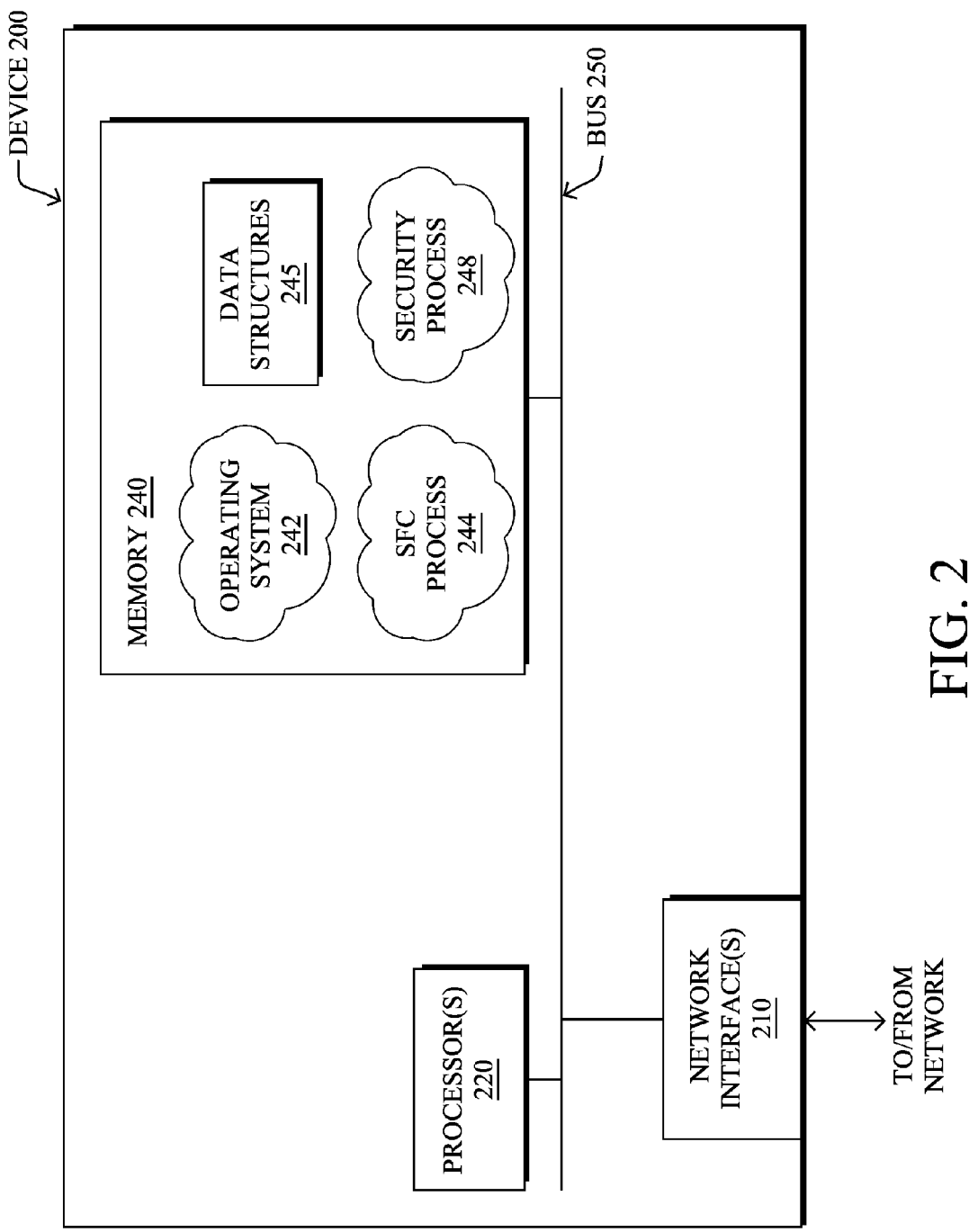
FIG. 2 illustrates an example network device/node.

FIG. 2 is a schematic block diagram of an example node/device 200 that may be used with one or more embodiments described herein, e.g., as any of the routers of network 100, or any other computing device that supports the operations of network 100 (e.g., switches, servers, etc.). Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s) 220, functionally organizes the node by, inter alia, invoking network operations in support of software processes and/or services executing on the device. These software processes and/or services may include a service function chaining (SFC) process 244 and/or a network security process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

SFC process/services 244 include computer executable instructions that, when executed by processor (s) 220, implement an SFC architecture in the network. For example, details regarding the SFC architecture can be found in the Internet Engineering Task Force (IETF) request for comments (RFC) 7665 entitled, "Service Function Chaining (SFC) Architecture" by J. Halpern et al., which is hereby incorporated by reference. In general, SFC facilitates the use of network services and provides for network location techniques to locate the device(s) that support these services. Example services may include, but are not limited to, caching services, firewall services, anti-intrusion services such as intrusion detection services (IDS) and intrusion prevention services (IPS), malware detection services, deep packet inspection (DPI) services, acceleration services, load balancing services, lawful intercept (LI) services, optimization services, etc. In particular, a service function chain comprises an ordered set of services that may be provided to network traffic based on the classification of the traffic.

As part of the SFC architecture, a service function path (SFP) may denote to which service functions a certain packet must be sent (e.g., which services are to perform their respective functions on the packet). The SFC device that selects the SFP for the packet may indicate the selected SFP by encapsulating the packet using SFC-specific information. Of note is that SFC encapsulation is used solely to include data plane context information and is not used for purposes of network packet forwarding. In particular, an SFC device may add a Network service header (NSH) to a packet or frame, to convey metadata and service path information that can be used to create the service plane. For transport, the NSH and packet may be encapsulated in an outer header. Details regarding an NSH protocol header can be found in the IETF draft entitled, "Network Service Header," by P. Quinn et al., the contents of which are hereby incorporated by reference.

For a given SFC, there can be a variable number of SFPs and a variable number of Rendered Service Paths (RSPs). Related to the concept of an SFP, an RSP refers to the actual points in the network to which a packet travels. In some cases, an SFP may be constrained to such a degree that the SFP also identifies the actual locations. However, in many cases, an SFP is less constrained, as a service chain can exist as a group of abstract functions/services. Each of the SFPs/RSPs may include a number of specific instances of service functions, service function forwarders (SFFs), and/or proxies. For example, an RSP may comprise the following chain: Firewall_A—NAT_C—Load_Balancer_G.

As noted above, the NSH architecture provides the mechanisms for the construction of service chains in a network and the forwarding of traffic through those service chains using network service headers carried within the data plane. The network service headers are imposed on to the original packet/frame through classification. An outer encapsulation used for transport between individual services of the service chain is then pushed onto the packet/frame. Forwarding of packets/frames is achieved at the service plane layer using the NSH headers. Specifically, a Service Path Identifier (SPI) and Service Index (SI) are used for this purpose. A unique SPI is used to identify a given service path instantiation of a service chain, and the SI is initialized to the total number of services within the service chain, and decremented at each service hop as packets/frames traverse through the service path.

Figure 3A:
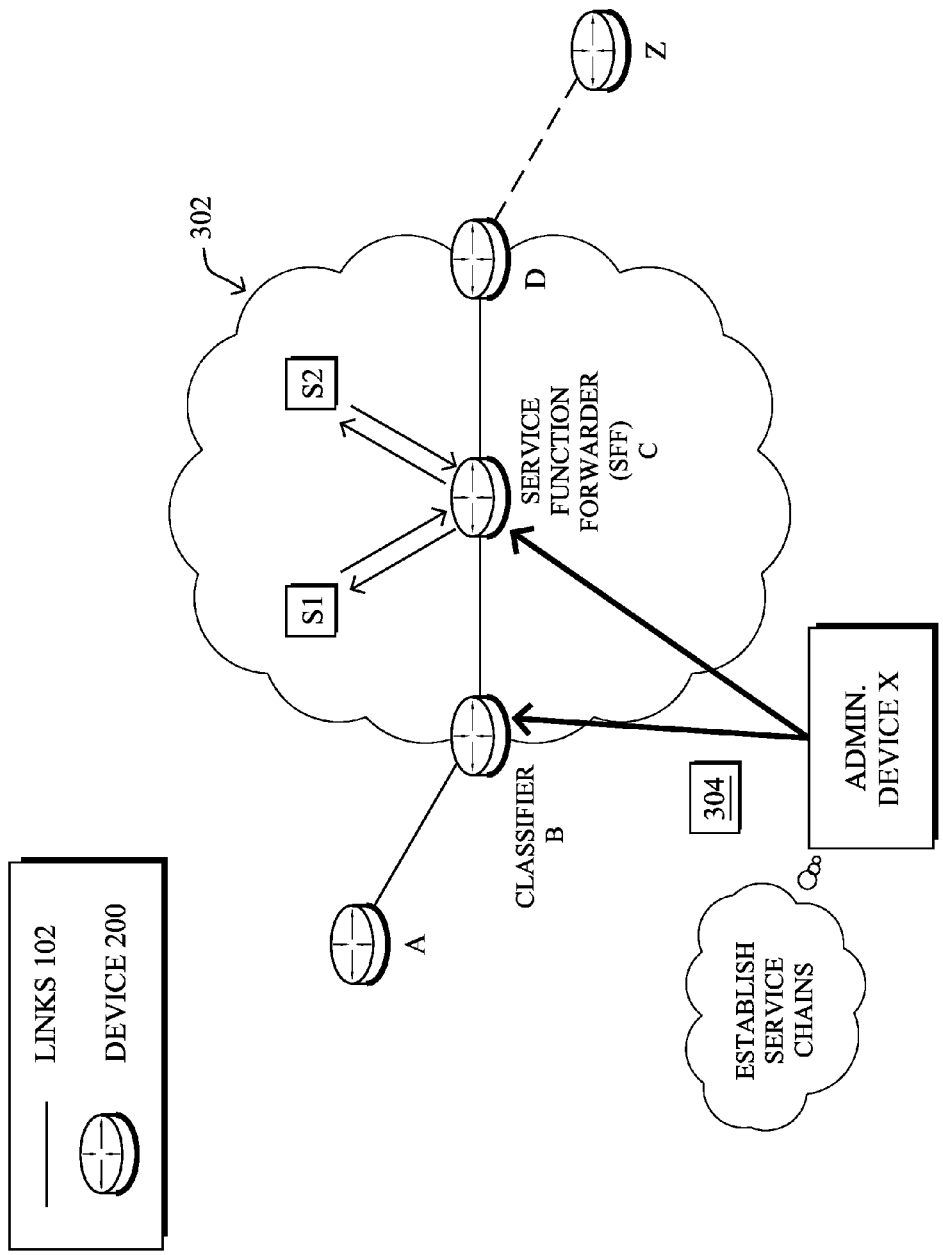
FIGS. 3A-3B illustrates an example of a service function chain (SFC) being configured.
Figure 3B:
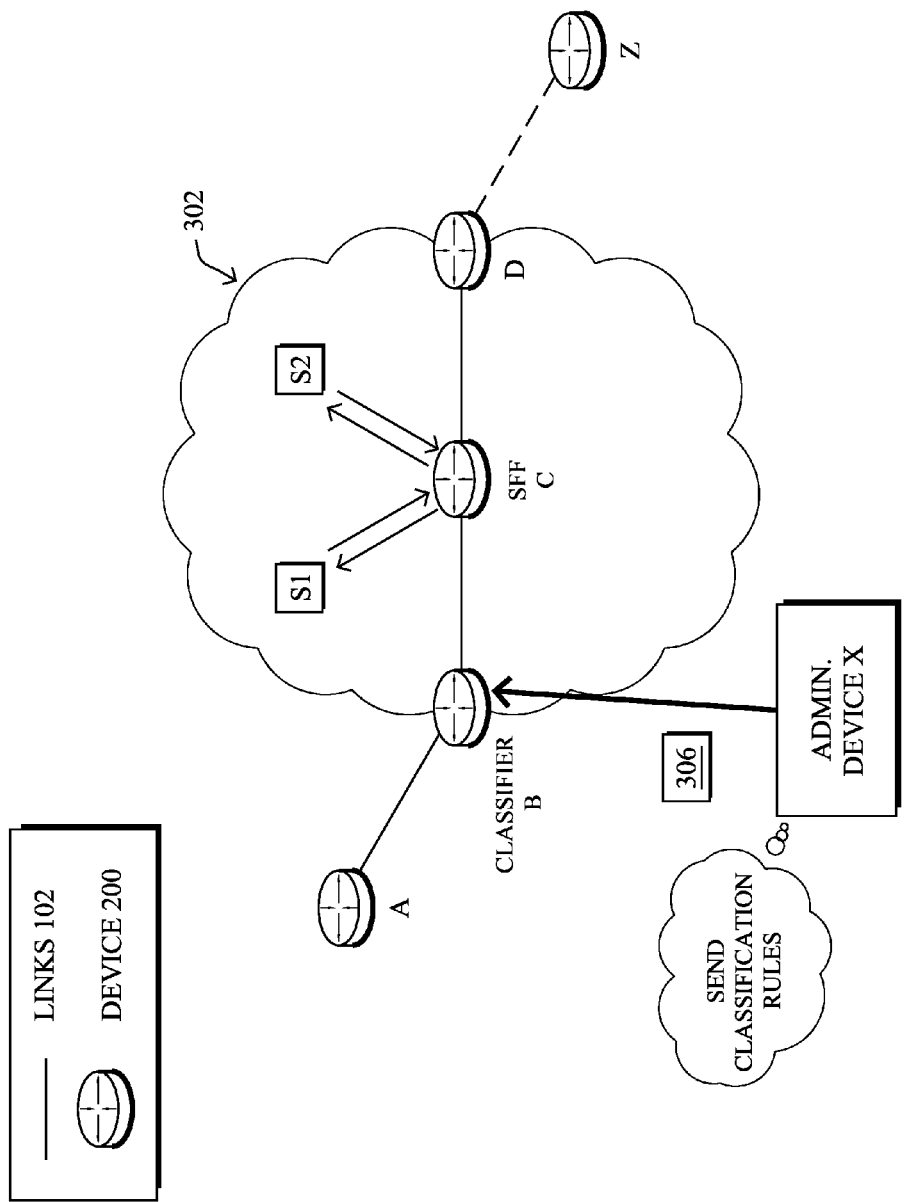

An example of an SFC being configured is shown in FIGS. 3A-3B. As shown in FIG. 3A, assume that nodes A-E exist along a path that traverses network portion 302. In particular, assume that node A is to send traffic to node E via the path shown. Further, assume that node B is an SFC classifier and that node C is an SFF that is configured to forward packets to a number of service functions, S1 and S2. For example, S1 may be a content filtering service and S2 may be a NAT service. In some cases, S1 and S2 may be provided by separate network devices. However, as service functions in an SFC can be virtualized, service functions S1 and S2 can also be implemented locally on node C, in other implementations. As would be appreciated, the nodes shown are presented in a simplified manner and the path between nodes A and E may comprise any number of intermediary nodes and service functions.

An administrator operating an administrative device/node X (e.g., a device 200) may define the service chains by sending instructions 304 to the devices/nodes associated with the chain. In some embodiments, the established service paths may be represented by their corresponding SPI and SI, to differentiate the different service paths. For example, one SFP may include service function S1, another SFP may include service function S2, a third SFP may include both service functions S1 and S2, etc. In various embodiments, Open Daylight (ODL), or another similar mechanism, may be used to configure an SFP.

As shown in FIG. 3B, classifier node B may also be programmed with classification rules 306 that are used by classifier node B to make SFC decisions based on the different types of user traffic that may be sent via node B. For example, one classification rule may require only HTTP traffic to pass through content filtering service function S1, whereas other types of traffic may not require this service. Similar to the SFP configurations, the administrator operating administrative device X may define classification rules 306 that are then sent to classifier node B.

Figure 4A:
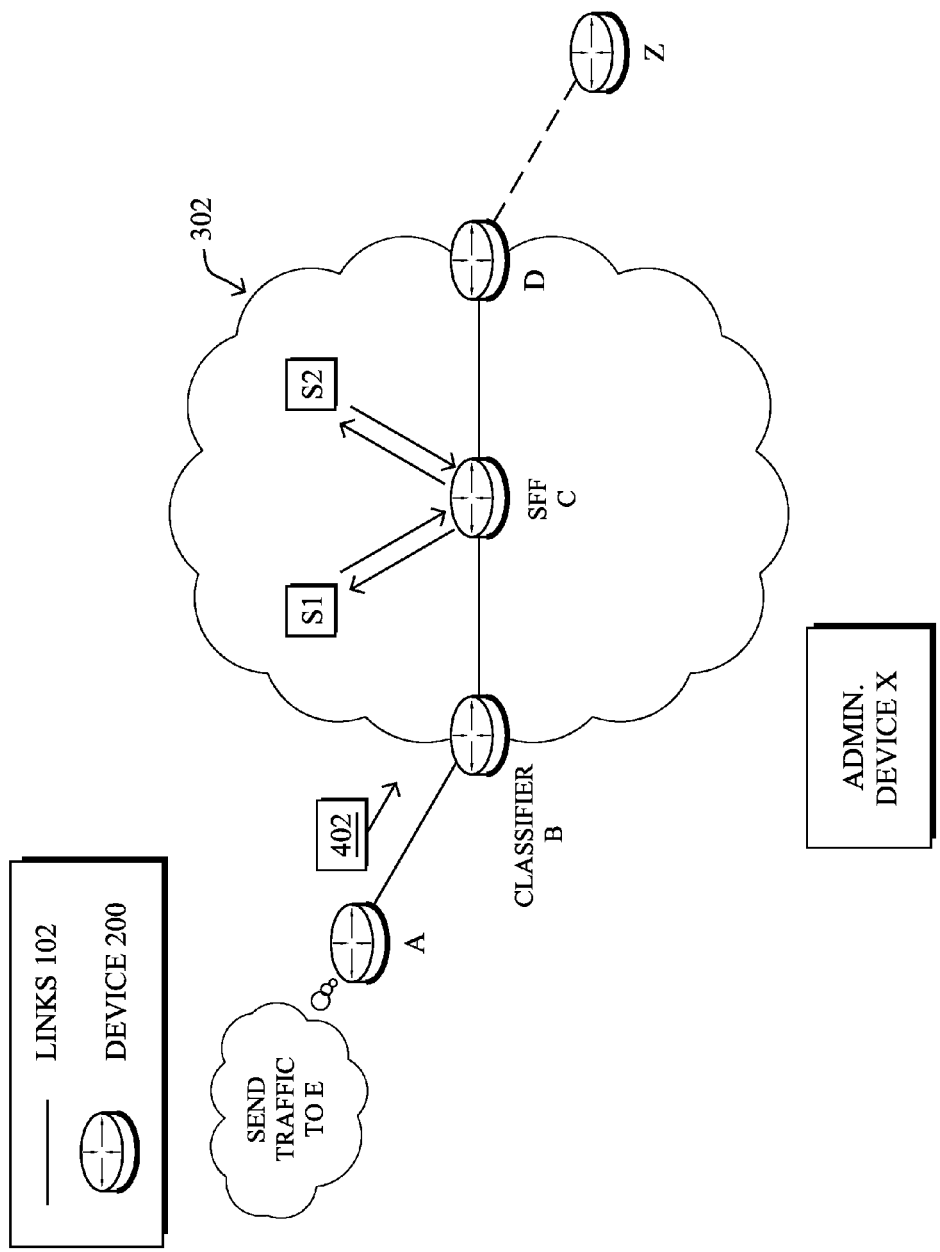
FIGS. 4A-4D illustrate examples of service function paths (SFPs) being used to convey traffic.

Referring now to FIGS. 4A-4D, examples of SFPs are shown. In FIG. 4A, assume that the SFPs have been established (e.g., as shown in FIGS. 3A-3B) and that node A sends user traffic 402 to node E via classifier node B. In such a case, any number of service functions (e.g., services functions S1, S2, etc.) may be performed on traffic 402, prior to delivery to its destination node E.

Figure 4B:
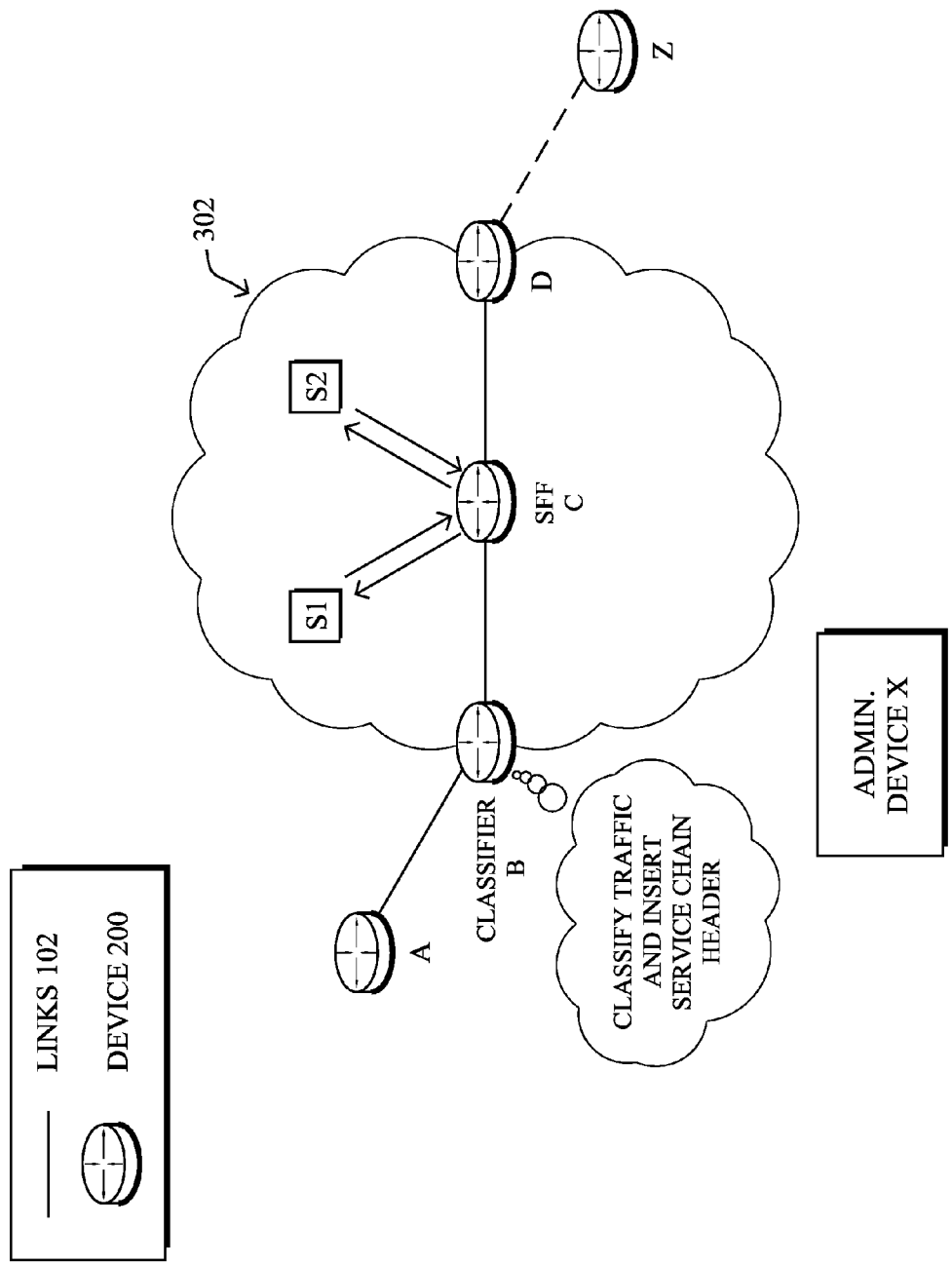

As shown in FIG. 4B, classifier node B may classify traffic 402 according to its programmed classification rules (e.g., rules 306). For example, classifier node B may classify traffic 402 by its type (e.g., the application associated with the traffic, etc.), its address information (e.g., the address and/or port of the source and/or destination device), or any other information that may be used to select a particular SFP for the traffic. Based on the classification, classifier node B may then construct a service chain header and encapsulate traffic 402 using the header. For example, classifier node B may select the SPI and SI associated with the classification and, in turn, may construct an NSH header for traffic 402 that indicates the selected values.

Figure 4C:
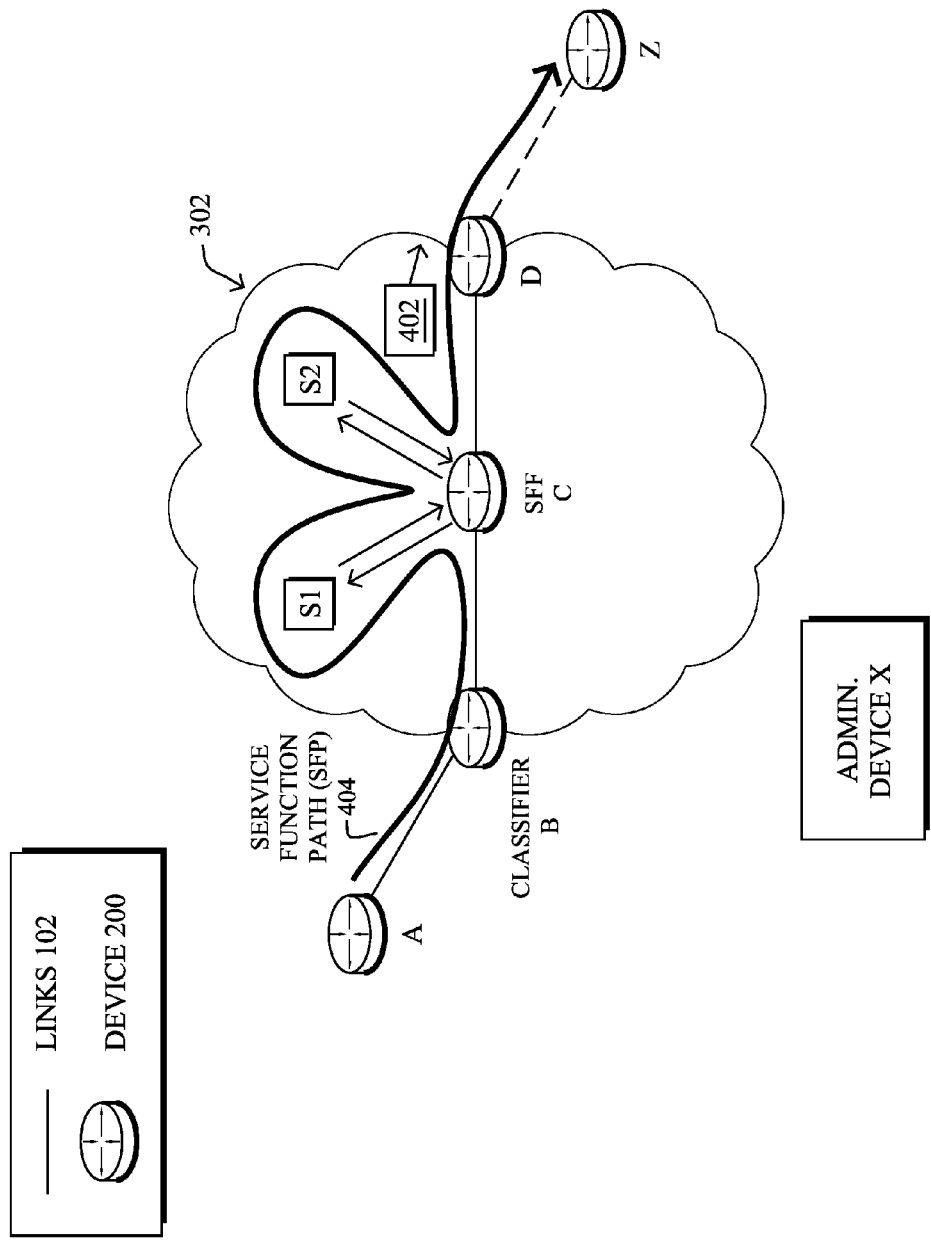

FIG. 4C illustrates a first SFP 404 that may be selected by classifier B for traffic 402. In particular, the NSH header added to traffic 402 may indicate that traffic 402 should be sent to both service functions S1 and S2 for processing. Notably, in response to receiving an NSH-encapsulated packet, SFF C may determine that traffic 402 should be sent first to service function S1 for processing, then on to service function S2, before being forwarded towards its intended destination, node E.

Figure 4D:
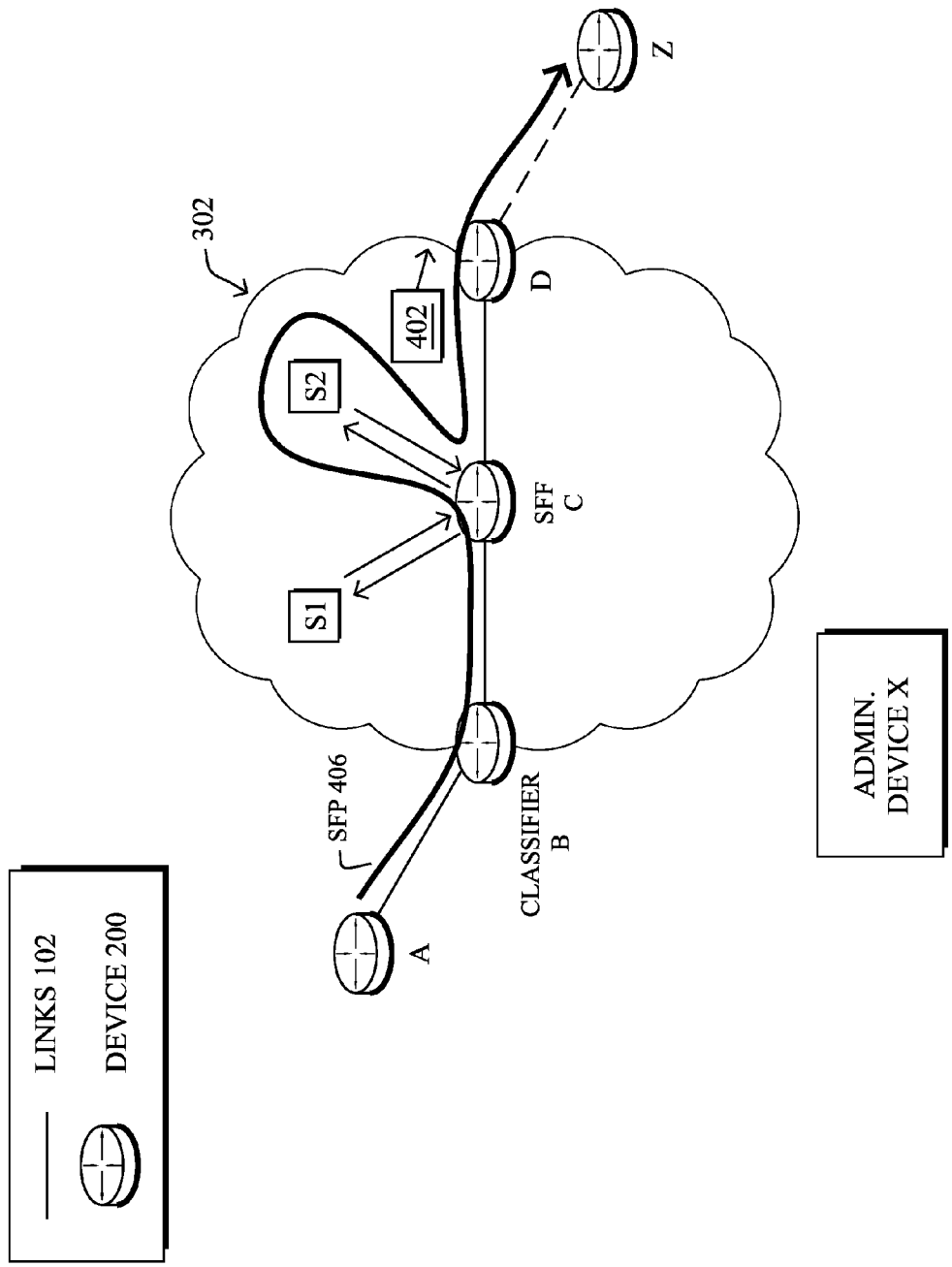

As shown in FIG. 4D, traffic 402 may traverse an alternate SFP 406, based on the NSH header inserted into traffic 402. For example, while SFP 404 includes both service functions S1 and S2, SFP 406 instead only includes service function S2. Thus, the classification of traffic 402 may affect which SFP, if any, the traffic will traverse before delivery to its destination.

As noted above, traditional TLS mechanisms present several potential security vulnerabilities that could be exploited during a certificate validation attack. First, the TLS proxy has no way of knowing which trust anchor should vouch for the domain associated with the server certificate. Additionally, since any domain can be vetted by any certificate authority, all domains will be vulnerable to a man-in-the middle attack if a certificate authority becomes compromised.

One approach to address the above security vulnerabilities of TLS proxies is the Domain Name Service (DNS)-Based Authentication of Named Entities (DANE). DANE is generally described in the IETF RFC 6698 entitled "The DNS-Based Authentication of Named Entities (DANE) Transport Layer Security (TLS) Protocol: TLSA," by Hoffman et al. Generally, DANE operates by binding the server certificate to the domain name using DNS Security Extensions (DNS-SEC).

Notably, DANE allows for the authentication of TLS clients and servers, without the reliance on a certificate authority, addressing both of the security vulnerabilities listed above. Instead, DANE proposes that the DNS server store the certificate/fingerprint as part of a TLSA record that is signed using DNSSEC (note that TLSA does not stand for anything). Thus, the certificate stored by the DNS server is controlled by the domain name holder, which may be self-signed or signed by a particular certificate authority.

A DANE-based TLSA record typically includes four fields:

1. Certificate Usage Field—Generally, this field indicates how the certificate for the domain should be used. Certificate usage '0' generally indicates the specific certificate authority that will provide certificates for the domain. This is also sometimes referred to as a "certificate authority constraint," as only the specified certificate authority can issue certificates for the service/host. Certificate usage '1' specifies the TLS certificate that should be used for the domain. Certificate usage '2' indicates the trust anchor that is to be used to validate the TLS certificates for the domain. Finally, certificate usage '3' indicates that the certificate is self-signed by the domain and does not need to be signed by a certificate authority.
2. Selector Field—This field specifies which portion of the certificate should be matched against the association data. A selection of '0' indicates that the full binary of the certificate is to be matched, whereas a selection of '1' indicates that the subject public key information should be matched.
3. Matching Type—This field specifies how the certificate association data indicated in the selector field should be presented. A matching type of '0' indicates that an exact match is required for the selected content. A matching type of '1' indicates that an SHA-256 hash of the selected content should be matched. A matching type of '2' indicates that an SHA-512 hash of the selected content should be matched.
4. Certificate Association Data Field—This field is used to store the full certificate or subject public key information selected in the selector field.

The DNS server may include the above certificate information as part of a DNS response. However, many applications and endpoint devices do not support DANE and, therefore, will not perform a DANE lookup. When this occurs, the intermediate TLS proxy will also not have visibility into the TLSA record that would otherwise be included in the DNS response. In particular, a DANE lookup involves multiple DNS requests and responses (e.g., to obtain a DNSKEY/RRSIG chain up from the root and to validate the chain of DNSSEC signatures).

In some embodiments, the TLS proxy may perform the DANE lookup after receiving the server certificate as part of the TLS handshake between the remote server and the client device. However, doing so will add significant latency to the TLS connection setup. Moreover, since the client device only sees the TLS proxy certificate and not the server certificate, it will not perform a DANE lookup.

Network Security System to Validate a Server Certificate

The techniques herein propose a security mechanism for TLS proxies and other security functions that inspect TLS handshakes. In some aspects, the security mechanism leverages DANE for purposes of certificate authorization, regardless of whether the local client device supports DANE. In particular, the security mechanism may use an SFC architecture to convey certificate information (e.g., DANE information, etc.) in NSH metadata between a TLS proxy and a DNS recursive server. In contrast to other mechanisms (e.g., public key pinning, etc.), the security mechanism can validate the certificate information on the first connection. In addition, the security mechanism herein is more secure that traditional TLS proxy mechanisms, as an attacker would also need to compromise the DNSSEC from the DNS root to perform an attack on the system.

Specifically, according to one or more embodiments of the disclosure as described in detail below, a Domain Name Service (DNS) server pre-fetches domain information regarding a domain that includes certificate information for the domain. The DNS server receives a DNS request that includes a security request for the domain in metadata of a Network Service Header (NSH) of the DNS request. The DNS server retrieves the certificate information for the domain from the pre-fetched information regarding the domain, in response to receiving the security request. The DNS server sends, to a Transport Layer Security (TLS) proxy, a DNS response for the domain that includes the certificate information in metadata of an NSH of the DNS response.

Illustratively, the techniques described herein may be performed by hardware, software, and/or firmware, such as in accordance with the security process 248, which may include computer executable instructions executed by the processor 220 (or independent processor of interfaces 210) to perform functions relating to the techniques described herein, e.g., in conjunction with SFC process 244.

Figure 5:
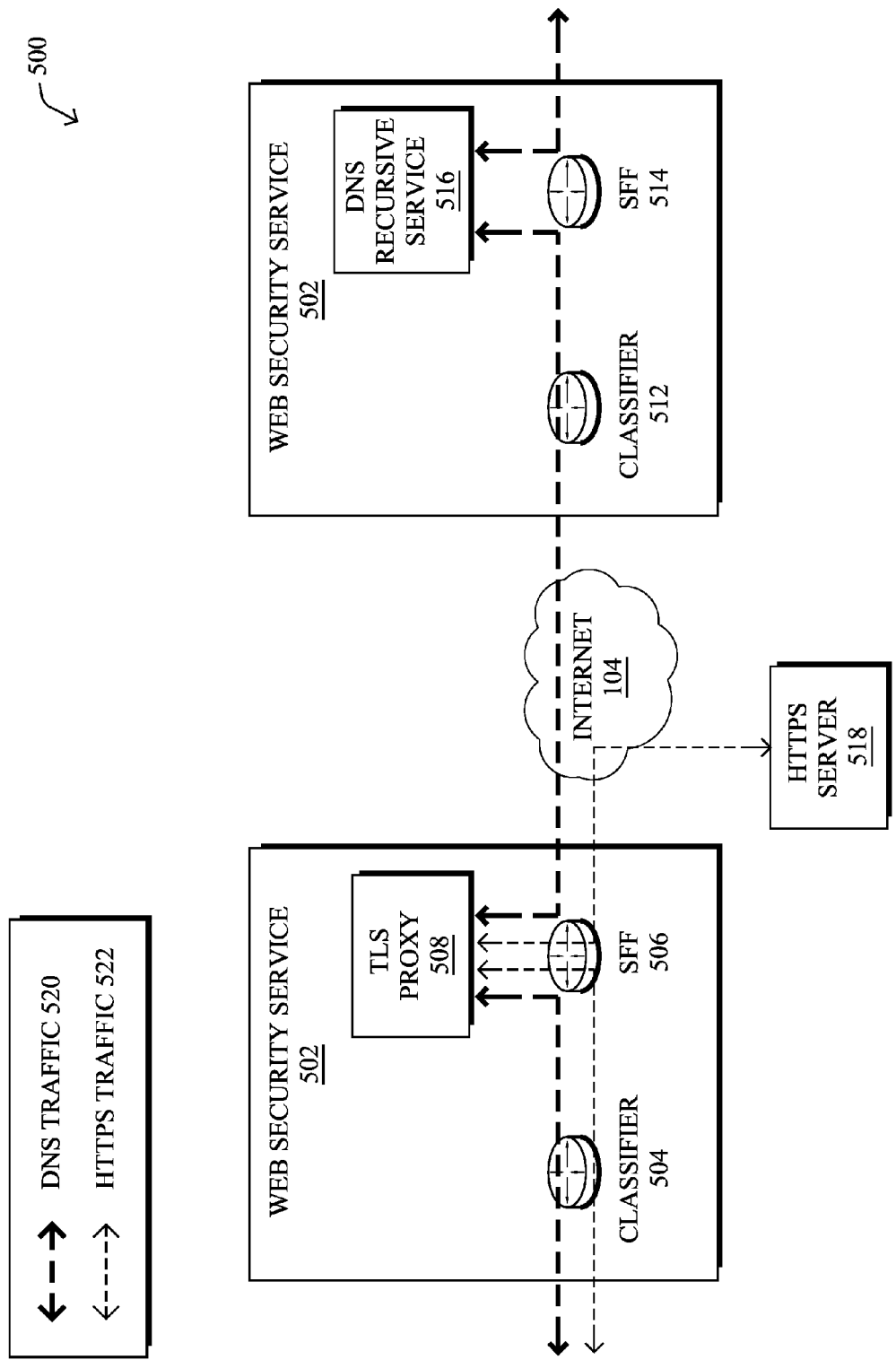
FIG. 5 illustrates an example network security system using SFC to convey server certificate information.

Operationally, FIG. 5 illustrates an example network security system 500 using SFC to convey server certificate information, according to various embodiments. As shown, system 500 may generally include two separate services: 1.) a web security service 502 and 2.) a DNS Security Service 510 in communication with one another via a core network 104, such as the Internet. In various embodiments, web security service 502 and/or DNS security service 510 may be implemented as a cloud-based service.

Generally, web security service 502 may include an SFC classifier 504, an SFF 506, and a TLS proxy 508. In some embodiments, TLS proxy 508 may be established in the SFC as a service function that is configured to intercept traffic between client devices (not shown) and HTTPS servers 518. TLS proxy 508 may be, for example, a server using Cloud Web Security from Cisco Systems, Inc. or any other TLS proxy server.

DNS security service 510 may include a second SFC classifier 512, an SFF 506, and a DNS recursive service 516. Generally, DNS recursive service 516 may be hosted by a corresponding DNS server/device that is also in communication with HTTPS server 518 via the Internet/network 104. For example, DNS recursive service 516 may be an OpenDNS service or similar service that provides DNS services for the domain of HTTPS server 518.

In various embodiments, SFC classifier 504 may classify traffic from a client device based on the type of traffic. In particular, SFC classifier 504 may process and classify DNS traffic 520 differently than user traffic such as HTTPS traffic 522. For example, SFC classifier 504 may inspect packets from the sending client/endpoint device, to determine whether the traffic is a DNS request (e.g., sent to DNS recursive service 516) or an encrypted packet (e.g., sent to HTTPS server 518). Based on the classification of the traffic from the client device, SFC classifier 504 may assign the traffic to a corresponding SFP.

As shown, if SFC classifier 504 determines that user traffic associated with the sender of DNS traffic 520 is to pass through TLS proxy 508, it may add a corresponding security request to the associated DNS requests in DNS traffic 520. For example, in some embodiments, SFC classifier 504 may apply an NSH header to the packets in DNS traffic 520 that includes the security request in NSH metadata. The applied NSH header may also identify an SFP that traverses through TLS proxy 508, DNS recursive service 516, and/or any other SFC services, as desired. Thus, on receipt of the encapsulated DNS packet in traffic 520, SFF 506 may forward the packet on to TLS proxy 508. In turn, the packet may be forwarded along the SFP on to the remote SFC classifier 512 and SSF 514, which forwards the packet/DNS request on to DNS recursive service 516. The NSH-based security request then signals to DNS recursive service 516 to return certificate information, such as DANE TLSA record information, in the DNS response.

On the return path, classifier 512 may perform a similar classification of any DNS responses from DNS recursive service 516 that causes the DNS response packet to be forwarded to TLS proxy 508 prior to forwarding the response on to the client device. Thus, TLS proxy 508 is able to intercept the certificate information included in the DNS response, which may include DANE information that would otherwise not be available to TLS proxy 508 if the client device does not support DANE.

HTTPS traffic between the client device and HTTPS server 518 may traverse a second SFP that includes, at a minimum, TLS proxy 508. Since TLS proxy 508 has the needed encryption information from the DNS/DANE lookup, it may decrypt the packets for further processing by any number of other security devices/services. For example, TLS proxy 508 may provide the unencrypted packets to an IPS service or the like, to assess the decrypted packet. TLS proxy 508 may also re-encrypt the HTTPS traffic 522 using its certificate information and forward the packets on to, e.g., HTTPS server 518. In other words, from the perspective of the client device, the client device may believe that it is communicating securely with HTTPS server 518 when, in reality, it is communicating with TLS proxy 508. Similarly, from the perspective of HTTPS server 518, it may believe that it is communicating securely with the client device when it is actually communicating directly with TLS proxy 508.

Figure 6:
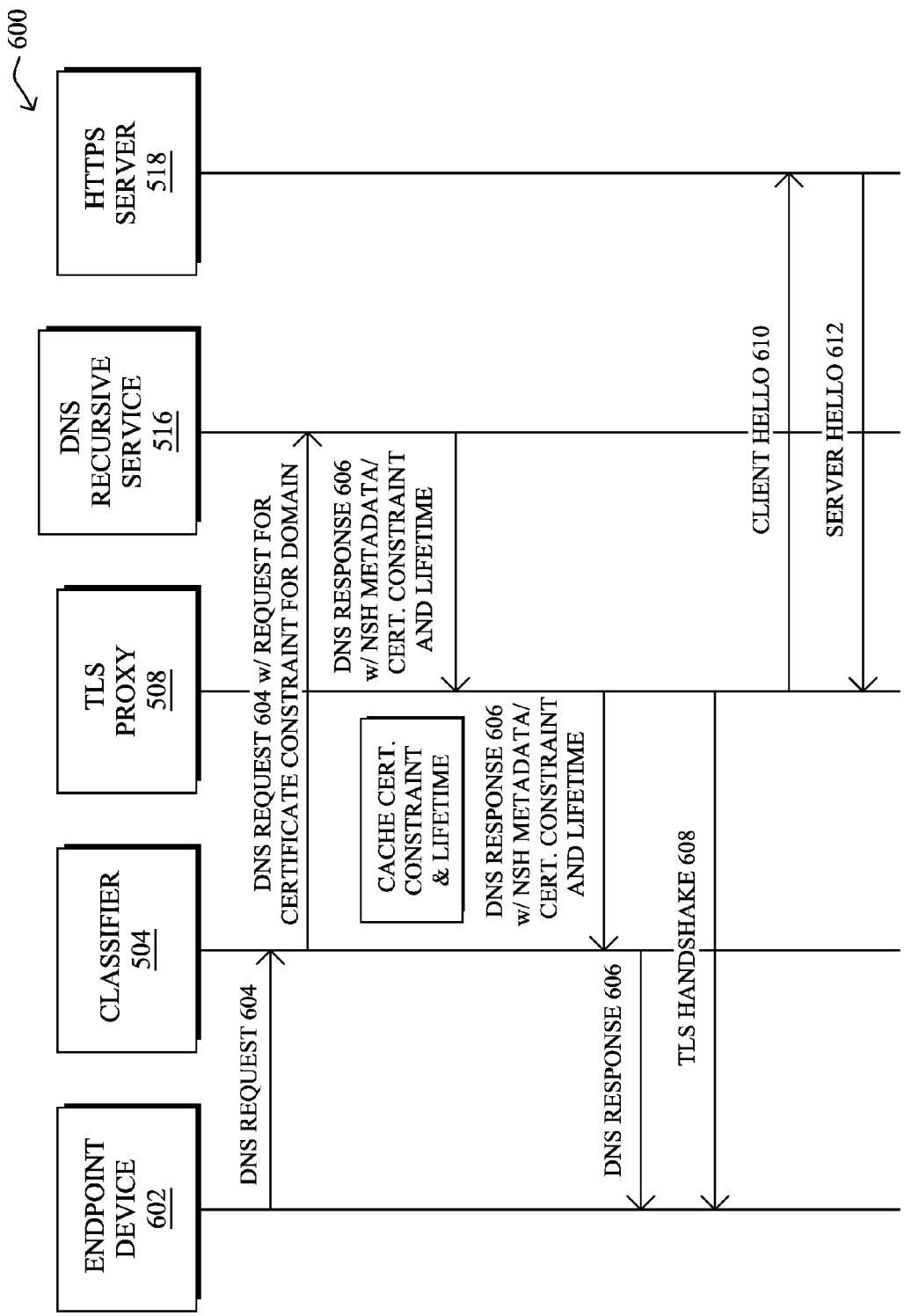
FIG. 6 illustrates an example sequence diagram of a network security system.

FIG. 6 illustrates an example sequence diagram 600 illustrating the operation of network security system 500, in accordance with various embodiments. As shown, DNS recursive service 516 may pre-fetch information about the domain of HTTPS server 518 and store the fetched information in a local cache. In various embodiments, this pre-fetching may entail maintaining a reputation score for the domain, performing a DANE lookup for the domain, fetching DNSSEC records, performing any DNSSEC validation, storing TLSA records for the domain, or performing any other operation to obtain domain/certificate information regarding the domain of HTTPS server 518. In turn, DNS recursive service 516 may use the pre-fetched information in its local cache to process any DNS request for the domain of HTTPS server 518, thereby avoiding the overhead of having to perform a DANE lookup each time.

As shown, assume that endpoint device 602 generates and sends a DNS request 604, to obtain domain information regarding the domain of HTTPS server 518. For example, endpoint device 602 may execute a web browser or other local application that will communicate with HTTPS server 518. In turn, endpoint device 602 may send DNS request 604, to obtain the requisite information to communicate with HTTPS server 518.

In response to receiving DNS request 604, SFC classifier 504 may determine whether any encrypted traffic associated with endpoint device 602 will traverse through a service function that will perform server certificate validation. For example, SFC classifier 504 may determine whether traffic from endpoint device 602 will traverse TLS proxy 508 or another networking device configured to perform or inspect a TLS handshake.

In various embodiments, if SFC classifier 504 determines that an intermediate service/device is to insert itself into the HTTPS encryption process between endpoint device 602 and a remote server (e.g., HTTPS server 518), classifier 504 may encapsulate DNS request 604 using an NSH header. For example, the appended NSH header may indicate that DNS request 604 is to traverse TLS proxy 508 and/or other SFP services. In some embodiments, classifier 504 may also include a security request in the metadata of the NSH header. Such a security request may request, for example, certificate information for the domain such as DANE-related information (e.g., certificate constraint, etc.), a certificate lifetime, or other information that TLS proxy 508 can use to perform a TLS handshake with endpoint device 602 as a proxy for HTTPS server 518.

Once the encapsulated DNS request 604 reaches DNS recursive service 516, the DNS service may perform a DNS lookup for the domain of HTTPS server 518. In addition, in various embodiments, DNS recursive service 516 may retrieve the pre-fetched certificate information from its local cache, as requested in the NSH metadata of DNS request 604.

After retrieving the DNS information requested by DNS request 604, as well as any certificate information if applicable to the domain, DNS recursive service 516 may generate and send a DNS response 606 back towards endpoint device 606. In various embodiments, DNS response 606 may also include any of the corresponding certificate information for the domain of HTTPS server 518. For example, if the domain of HTTPS server 518 has deployed DANE, DNS recursive service 516 may include the certificate constraint, certificate lifetime, and/or other TLSA record information in NSH metadata of DNS response 606.

As TLS proxy 508 is now on the return path of DNS response 606 and DNS response 606 includes the certificate/DANE information for the domain of HTTPS server 518, TLS proxy 508 is able to capture the certificate/DANE information as part of the communication. Doing so addresses the situations whereby the application of endpoint device 602 does not support DANE. Without such a mechanism, TLS proxy 508 would be unable to capture the DANE information or otherwise use DANE, thus exposing TLS proxy 508 to the potential security holes of traditional TLS mechanisms. Once TLS proxy 508 captures the certificate information from the NSH metadata of DNS response 604, TLS proxy 508 may cache the certificate information and forward DNS response 606 on towards endpoint device 602.

For example, TLS proxy 508 may cache the certificate constraint and lifetime of the server certificate for the domain of HTTPS server 518. After expiration of the lifetime of the certificate, TLS proxy 508 may purge the certificate information, accordingly.

When DNS response 606 leaves the SFP, its NSH header will be stripped before DNS response 606 is forwarded to endpoint device 602. Thus, from the perspective of endpoint device 602, DNS response 606 is a traditional DNS response. In turn, using the information included in DNS response 606, endpoint device 602 may attempt to initiate a TLS handshake 608 with HTTPS server 518. Similar to the classification of DNS request 604, classifier 504 may determine that TLS handshake 608 should be forwarded to TLS proxy 508, encapsulate the packets using an NSH header that forwards the packets to TLS proxy 508, and send the packets along the corresponding SFP.

Since TLS proxy 508 has all of the necessary certificate information for the domain of HTTPS server 518, TLS proxy 508 may act as a proxy during TLS handshake 608. In other words, endpoint device may 602 may believe that it is establishing an encrypted connection directly with HTTPS server 518 when, in reality, it is communicating with TLS proxy 508. In various embodiments, when TLS proxy 508 receives the server certificate for HTTPS server 518 as part of TLS handshake 608, it may use its cached certificate information to validate the certificate. In turn, TLS proxy 508 and HTTPS server 518 may exchange hello messages 610 and 612, respectively, to complete the exchange and establish TLS proxy 508 between endpoint device 602 and HTTPS server 518. This allows TLS proxy 508 to intercept and decrypt any packets between these devices and initiate further processing of the packets (e.g., by forwarding the packets to an IPS, for DPI inspection, etc.).

Figure 7:
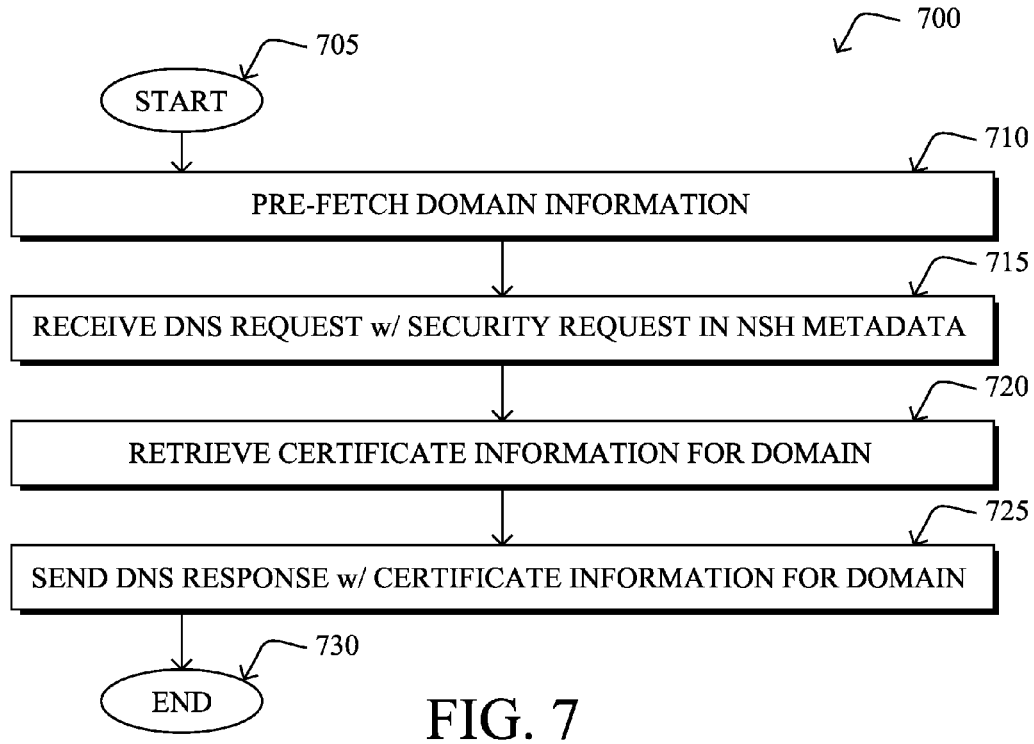
FIG. 7 illustrates an example simplified procedure for including certificate information in a Domain Name Service (DNS) response.

FIG. 7 illustrates an example simplified procedure for including certificate information in a DNS response, in accordance with one or more embodiments described herein. For example, a non-generic, specifically configured device (e.g., device 200) may perform procedure 700 by executing stored instructions (e.g., processes 244,248). For example, a DNS server may perform procedure 700 by executing stored instructions. The procedure 700 may start at step 705, and continues to step 710, where, as described in greater detail above, the DNS server may pre-fetch domain information for a domain. In various embodiments, this pre-fetch may entail performing a DANE lookup of the domain and obtaining server certificate information such as a certificate constraint, a certificate lifetime, other TLSA record information, or the like. In further embodiments, the DNS server may also employ DNSSEC with the domain by retrieving DNSSEC record information for the domain as part of the pre-fetch and using the record information to validate the domain. In various embodiments, the DNS server may also cache any of the pre-fetched domain information, so that it does not have to perform a full lookup each time that it receives a DNS request for the domain. For example, the DNS server or other device in the network may store TLSA records for the domain as part of the pre-fetching.

At step 715, the DNS server may receive a DNS request that includes a security request in NSH metadata of the request, as describe in greater detail above. For example, the DNS request may be encapsulated using an NSH header that includes a request for certificate information for the domain (e.g., DANE-related information).

At step 720, as detailed above, the DNS server may retrieve the requested certificate information for the domain.

If, for example, the DNS server cached the certificate information as part of the pre-fetching in step 710, the DNS server may retrieve the corresponding information from its local memory. As noted, the certificate information may include the corresponding DANE information for the domain, such as the certificate constraint, certificate lifetime, and the like.

At step 725, the DNS server may generate and send a DNS response that includes the information requested in the DNS request of step 715, as described in greater detail above. In various embodiments, the DNS server may send the request back towards the requesting endpoint device and through a TLS proxy, allowing the TLS proxy to obtain the certificate information included in the DNS response. In some embodiments, the certificate information may be included in NSH metadata of the DNS response, thereby allowing the TLS proxy to store the certificate information before forwarding the DNS response on towards the endpoint device. Procedure 700 then ends at step 730.

Figure 8:
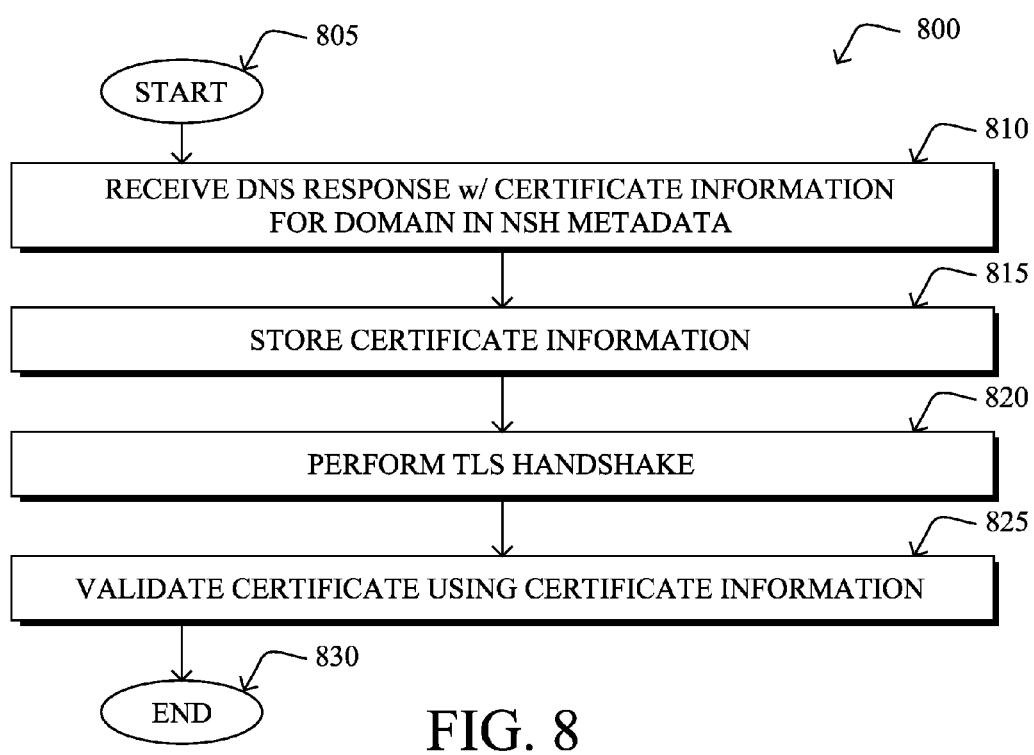
FIG. 8 illustrates an example simplified procedure for using certificate information included in a DNS response to validate a server certificate.

FIG. 8 illustrates an example simplified procedure for using certificate information included in a DNS response to validate a server certificate, in accordance with one or more embodiments described herein. For example, a non-generic, specifically configured device (e.g., device 200) may perform procedure 800 by executing stored instructions (e.g., processes 244,248). For example, a TLS proxy or other networking device may perform procedure 800 by executing stored instructions. The procedure 800 may start at step 805, and continues to step 810, where, as described in greater detail above, the device may receive a DNS response that includes certificate information in NSH metadata for a domain. As noted, such certificate information may include DANE-related information such as a certificate constraint, other TLSA record information, a certificate lifetime, or any other certificate information that can be used to establish a secure connection with a server in the domain.

At step 815, as detailed above, the device may store the certificate information. For example, the device may store the certificate information included in as NSH metadata in the DNS response within a local cache of the device.

At step 820, the device may perform a TLS handshake with the endpoint device associated with the DNS response, as described in greater detail above. In particular, the device may perform a handshake with the endpoint device, acting as a proxy for the intended secure server. Doing so will allow the TLS proxy/device to intercept otherwise encrypted communications between the endpoint device and the server.

At step 825, as detailed above, the device may use the stored certificate information to validate the server certificate for the domain. In particular, if the stored certificate information includes DANE-related information, this allows the device to leverage DANE during the TLS proxy process, without requiring the endpoint device to also support DANE. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, optimize TLS connection setup times on TLS security mechanisms/devices that perform DANE validation. In addition, the techniques herein allow these security mechanisms/devices to leverage DANE as an certificate authorization mechanism, thereby allowing the use of DANE in cases where the endpoint devices/applications do not support DANE.

While there have been shown and described illustrative embodiments that provide for network security, it is to be understood that various other adaptations and modifications may be made within the spirit and scope of the embodiments herein. For example, while certain protocols are shown, such as HTTPS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
pre-fetching, by a Domain Name System (DNS) server in a network, domain information regarding a domain that includes certificate information for the domain;
receiving, at the DNS server, a DNS request that includes a security request for the domain in metadata of a Network Service Header (NSH) of the DNS request, wherein a NSH is a mechanism for the construction of a service chain in a network and forwarding of traffic through the service chain using the NSH in a data plane;
retrieving, by the DNS server, the certificate information for the domain from the pre-fetched information regarding the domain, in response to receiving the security request;
sending, by the DNS server and to a Transport Layer Security (TLS) proxy, a DNS response for the domain that includes the certificate information in metadata of an NSH of the DNS response; and
performing, by the DNS server, a DNS-Based Authentication of Named Entities (DANE) lookup of the domain, to retrieve the certificate information.

2. The method as in claim 1, wherein the certificate information includes one or more of: a certificate usage indicator, a selector field that indicates whether or not a full certificate for the domain will be matched, or certificate association data.

3. The method as in claim 1, wherein the certificate information includes a certificate lifetime.

4. The method as in claim 1, wherein pre-fetching the domain information regarding the domain comprises:
obtaining a reputation score for the domain.

5. The method as in claim 1, wherein the TLS proxy stores the certificate information and uses the cached certificate information to validate a security certificate associated with the domain.

6. The method as in claim 1, wherein pre-fetching the domain information regarding the domain comprises:

fetching DNS Security Extensions (DNSSEC) records for the domain; and
performing DNSSEC validation using the fetched DNSSEC records.

7. An apparatus, comprising:
one or more network interfaces to communicate with a network;
a processor coupled to the network interfaces and configured to execute one or more processes; and
a memory configured to store a process executable by the processor, the process when executed operable to:
pre-fetch domain information regarding a domain that includes certificate information for the domain;
receive a DNS request that includes a security request for the domain in metadata of a Network Service Header (NSH) of the DNS request, wherein a NSH is a mechanism for the construction of a service chain in a network and forwarding of traffic through the service chain using the NSH in a data plane;
retrieve the certificate information for the domain from the pre-fetched information regarding the domain, in response to receiving the security request; and
send, to a Transport Layer Security (TLS) proxy, a DNS response for the domain that includes the certificate information in metadata of an NSH of the DNS response; and
perform a DNS-Based Authentication of Named Entities (DANE) lookup of the domain, to retrieve the certificate information.

8. The apparatus as in claim 7, wherein the certificate information includes one or more of: a certificate usage indicator, a selector field that indicates whether or not a full certificate for the domain will be matched, certificate association data, or a certificate lifetime.

9. The apparatus as in claim 7, wherein the apparatus pre-fetches the domain information by determining a reputation score for the domain.

10. The apparatus as in claim 7, wherein the TLS proxy stores the certificate information and uses the cached certificate information to validate a security certificate for the domain.

11. The apparatus as in claim 7, wherein the apparatus pre-fetches the domain information regarding the domain by:
fetching DNS Security Extensions (DNSSEC) records for the domain; and
performing DNSSEC validation using the fetched DNSSEC records.

12. The apparatus as in claim 7, wherein the apparatus is a recursive DNS server.

13. The apparatus as in claim 7, wherein a service function classifier inserted the security request for the domain into the NSH metadata of the DNS request.

14. A tangible, non-transitory, computer-readable medium storing program instructions that cause a device in a network to execute a process comprising:
pre-fetching, by a Domain Name System (DNS) server in a network, domain information regarding a domain that includes certificate information for the domain;
receiving, at the DNS server, a DNS request that includes a security request for the domain in metadata of a Network Service Header (NSH) of the DNS request, wherein a NSH is a mechanism for the construction of a service chain in a network and forwarding of traffic through the service chain using the NSH in a data plane;
retrieving, by the DNS server, the certificate information for the domain from the pre-fetched information regarding the domain, in response to receiving the security request;
sending, by the DNS server and to a Transport Layer Security (TLS) proxy, a DNS response for the domain that includes the certificate information in metadata of an NSH of the DNS response; and
performing, by the DNS server, a DNS-Based Authentication of Named Entities (DANE) lookup of the domain, to retrieve the certificate information.

15. The tangible, non-transitory, computer-readable medium as in claim 14, wherein the certificate information includes one or more of: a certificate usage indicator, a selector field that indicates whether or not a full certificate for the domain will be matched, certificate association data, or a certificate lifetime.

16. The tangible, non-transitory, computer-readable medium as in claim 14, wherein the apparatus pre-fetches the domain information by determining a reputation score for the domain.

17. The tangible, non-transitory, computer-readable medium as in claim 14, wherein the TLS proxy stores the certificate information and uses the cached certificate information to validate a security certificate for the domain.

18. The tangible, non-transitory, computer-readable medium as in claim 14, wherein the apparatus pre-fetches the domain information regarding the domain by:
fetching DNS Security Extensions (DNSSEC) records for the domain; and
performing DNSSEC validation using the fetched DNSSEC records.

19. The tangible, non-transitory, computer-readable medium as in claim 14, wherein the apparatus is a recursive DNS server.

20. The tangible, non-transitory, computer-readable medium as in claim 14, wherein a service function classifier inserted the security request for the domain into the NSH metadata of the DNS request.

* * * * *